United States Patent [19]

Hare et al.

[11] Patent Number: 5,163,275

[45] Date of Patent: Nov. 17, 1992

[54] PIVOTING HANDLE MOUNTING ARRANGEMENT FOR LAWN MOWER

[76] Inventors: Ronald G. Hare; Kristoffer A. Hess, both of R.R. #2, Brockville, Ontario, Canada, K6V 5T2; Ronald A. Jackson, 189 Reynolds Dr., Brockville, Ontario, Canada, K6V 1X3

[21] Appl. No.: 532,037

[22] Filed: Jun. 1, 1990

[51] Int. Cl.$^5$ ............................................. A01D 34/82
[52] U.S. Cl. ............................... 56/16.7; 56/DIG. 18; 280/47.36
[58] Field of Search ............... 56/2, 1, 16.7 DIG. 9, 56/DIG. 18; 280/47.315, 47.36, 47.371

[56] References Cited

U.S. PATENT DOCUMENTS

| | | | |
|---|---|---|---|
| 2,716,559 | 8/1955 | Boyce | 280/47.36 |
| 2,786,694 | 3/1957 | Gray | 280/47.371 |
| 3,144,258 | 8/1964 | Ottosen et al. | 280/47.36 |
| 3,764,156 | 10/1973 | Nepper et al. | 56/DIG. 18 |
| 4,660,850 | 4/1987 | Nakano et al. | 280/47.36 |

FOREIGN PATENT DOCUMENTS

| | | |
|---|---|---|
| 0812466 | 5/1969 | Canada . |
| 0821784 | 9/1969 | Canada . |
| 0848135 | 8/1970 | Canada . |
| 1177304 | 11/1984 | Canada . |
| 0422413 | 1/1947 | Italy ................................ 280/47.36 |

Primary Examiner—Terry L. Melius

[57] ABSTRACT

An improved releasable handle assembly for power driven lawn and garden devices is disclosed. The improved handle assembly includes a "handle to pivot pin" connection for releasably attaching the handle assembly to pivot pins. Coactive with the "handle to pivot pin" connection is an improved "handle to deck" latching system. The deck includes a pair of offset tower assemblies defining inclined forward and rearward handle positions. A latching mechanism is mounted to said handle assembly for telescopic movement thereon through a limited range of motion for releasably engaging said handle tower assemblies. An operator must disengage the latch mechanism from the handle tower to permit selective pivotal movement of the handle assembly to the opposite inclined position.

45 Claims, 11 Drawing Sheets 5,163,275

PIVOTING HANDLE MOUNTING ARRANGEMENT FOR LAWN MOWER

BACKGROUND AND SUMMARY OF THE INVENTION

The present invention relates generally to rotary power lawn mowers and, in particular, to an improved pivotable handle mounting and latching arrangement for lawn mowers.

As a convenience option, power driven lawn mowers have heretobefore been equipped with pivotally movable handle assemblies. In particular, the handle assembly can be pivotably reversed or "flipped-over" on the deck of the lawn mower through a predetermined range of angular motion so that the lawn mower can be pushed in either a forward or a reverse direction. Conventionally, pivoting handle assemblies have been attached to the deck of the lawn mower by utilizing a plurality of separate structural components, such as mounting brackets, which must be assembled together. Therefore, removal of conventional handle assemblies for storage is a time-consuming and tedious process since disassembly is required.

The present invention relates to an improved handle assembly which cooperates with an improved unitary deck housing structure to overcome the disadvantages of the prior art. In particular, handle towers and pivot pin mounts, integrally associated with the deck housing, have eliminated the need for assembly of separate handle mounting and support brackets which are modernly installed on most lawn mower decks. The pivot pin mounting structure of the present invention provides for the simple permanent installation of a pivot pin to the deck housing. In addition, the improved handle assembly of the present invention includes means for providing a "handle to pivot pin" connection for releasably attaching the handle assembly to the pivot pins. Therefore, the improved handle assembly can be conveniently removed for storage of the lawn mower.

Coacting with the "handle to pivot pin" connection is a "handle to deck" latching system. In particular, the improved deck housing includes a pair of laterally offset handle tower assemblies, each having an upstanding forward and rearward lug for defining a forward or a reverse position of the handle assembly relative to the deck housing. A latching mechanism is mounted coaxially relative to a tubular portion of the handle assembly. The latching mechanism is adapted for telescopic movement relative to the handle assembly through a limited range of motion for releasably engaging one of the upstanding lugs. The latch mechanism is normally biased to positively latch for preventing unintended or accidental handle "flip-over" or reversing during use but is controllably releasable by the operator. As such, the operator is able to disengage the latch mechanism from the upstanding lug for permitting selective pivotable movement of the handle assembly when it is desired to push the mower in an opposite direction. Furthermore, the latch mechanism is located on the side of the lawn mower opposite a grass discharge opening in the deck housing so that the operator is compelled to walk around the mower in a direction opposite to the discharge opening when the handle assembly is reversed.

The deck housing construction of the present invention is adapted to be integrally formed an includes means for supporting a drive motor together with the improved handle assembly and ground engaging wheels. As such, the improved deck housing construction is relatively inexpensive to manufacture, light in weight, rugged in construction and reliable in use.

Other objects and advantages of the present invention will become more apparent from a reading of the following specification taken in conjunction with the appended claims and the following drawings.

DETAILED DESCRIPTION OF THE PREFERRED EMBODIMENT

Figure 1:
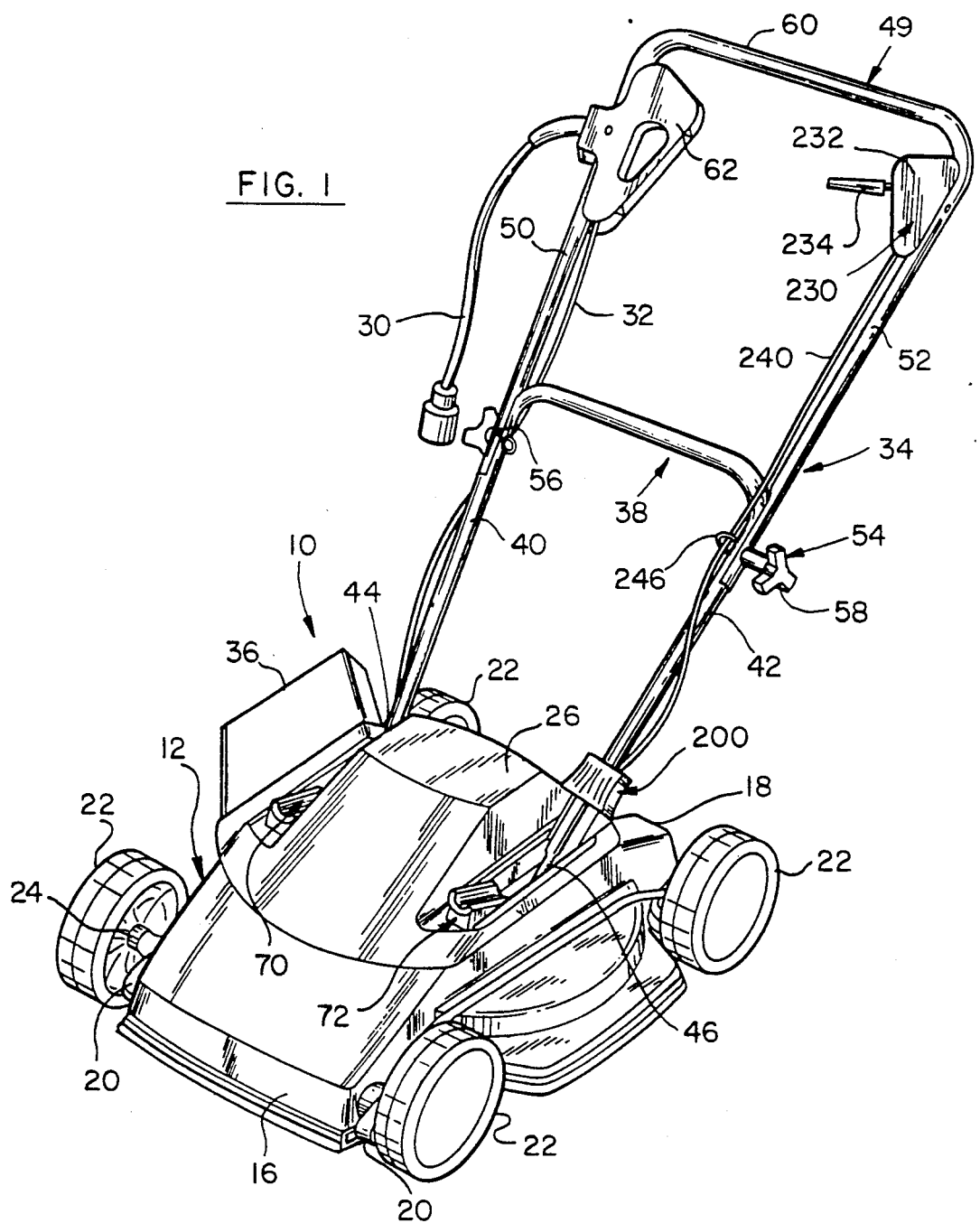
FIG. 1 is a perspective view of a lawn mower embodying the features of the present invention.

With particular reference to the drawings, a rotary lawn mower 10 embodying the novel features of the present invention is illustrated. More particularly, rotary mower 10 is a wheel supported, electric lawn mower, which is one type of lawn and garden device for which the present invention is particularly useful. However, it is to be understood that the present invention is not restricted to the exemplary embodiment shown, and may be employed in other types of lawn and garden devices, including both gas and electric powered as well as wheel and air supported devices.

Mower 10 includes a deck housing 12 which is preferably cast or molded of a lightweight, relatively rigid material. Deck housing 12 defines a front portion 16 and a rear portion 18 and supports four (4) wheel extensions or feet 20 thereon. A set of four (4) ground engaging wheels 22 are journaled on support shafts 24 which are either affixed to or otherwise suitably supported by feet 20. An electric motor (not shown) is supported upon and affixed to a generally centralized portion of deck housing 12 and is covered and protected by a removable insulative shroud member 26. The underside portion of deck housing 12 defines a blade cavity within which at least one rotary cutting blade (not shown) is supported an driven by the motor (not shown) through a suitable power transmission device (not shown). The electric motor is powered from a remote electrical source connected thereto by a line cord 30 and a motor cable 32. An improved handle assembly 34 is releasably connected to deck housing 12, in a manner to be described hereinafter in greater detail, and supports line cord 30 and motor cable 32 such that when the electric motor is energized and mower 10 is moved over the ground, the blades rotate to perform the desired lawn cutting operation. However, it is to be understood that the present invention is readily adapted for application to any other power-driven (i.e. cordless or gasoline) lawn and garden device. A discharge opening 36 is integrally formed in deck housing 12 and extends from one side thereof for discharging grass clippings from the blade cavity.

Figure 2:
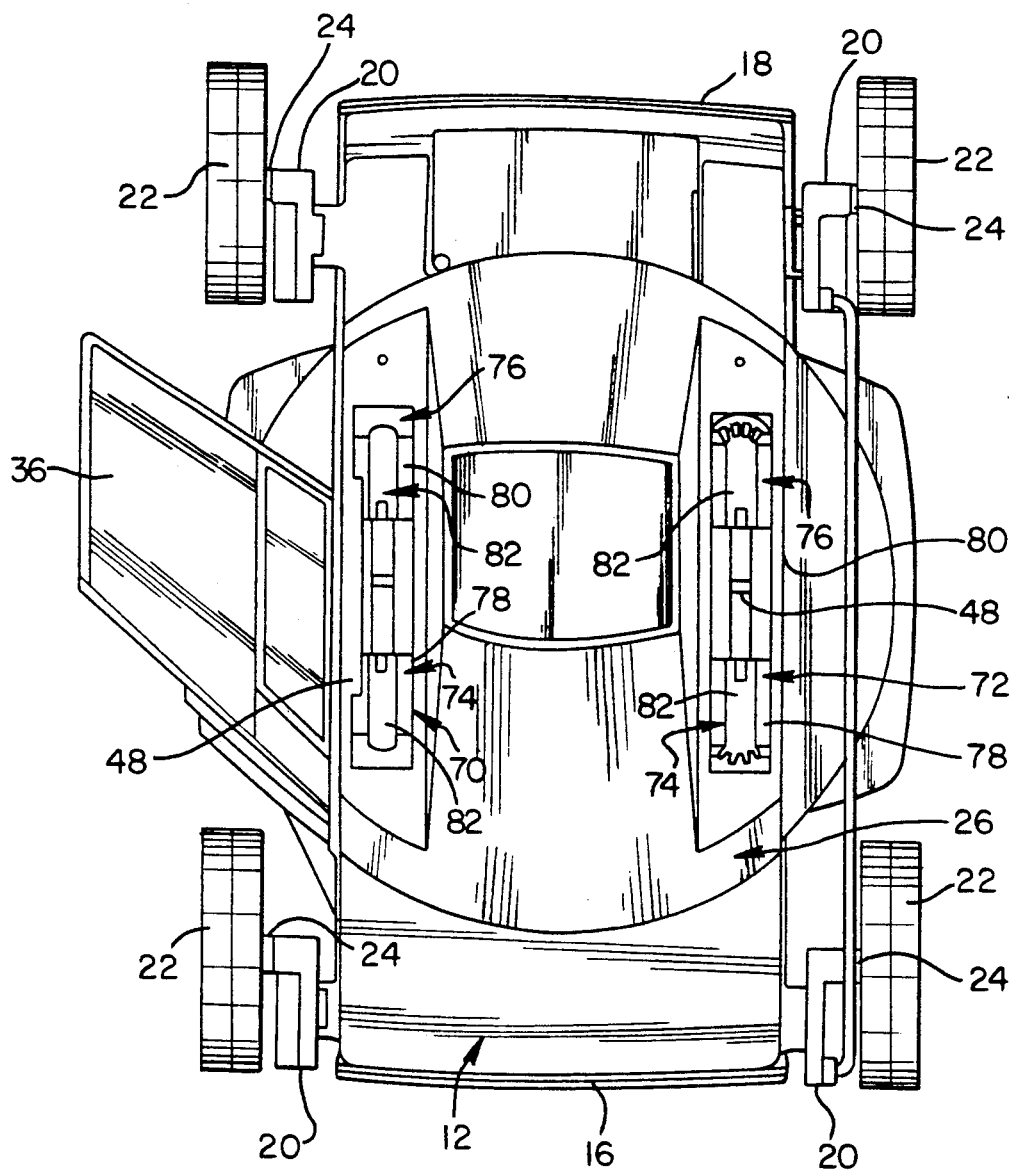
FIG. 2 is a plan view of FIG. 1 with the handle assembly removed.

With particular reference to FIG. 1, handle assembly 34 is shown to include a first generally U-shaped tubular frame member which defines a lower handle member 38. The tubular frame member has a first leg 40 and second leg 42 which extend toward deck housing 12 and which terminate in terminal ends 44 and 46, respectively. As will be described hereinafter, terminal ends 44 and 46 are adapted to be releasably connected to a longitudinal pivot pin 48 (FIG. 2) secured to deck housing 12. A second generally U-shaped tubular member defining an upper handle member 49 includes first leg 50 and second leg 52 which are secured at their lowermost ends to first and second legs 40 and 42, respectively, of lower handle member 38 such as by clamp assembly 54. In particular, a bolt 56 is provided which extends through alignment bores in the upper and lower handle members such that a locking handle 58 threadably tightens or loosens upper handle member 49 relative to lower handle member 38. In this manner, handle assembly 34 can be easily folded into a more compact orientation.

The upper transversely extending portion of upper handle member 49 defines a handle grip 60 which the operator grips for pushing mower 10. Line cord 30 depends from first leg 50 of upper handle member 49 and is connected to a control switch 62 such that both line cord 30 and control switch 62 are electrically interconnected to motor cable 32. Control switch 62 is provided to facilitate easy on/off control of the motor and may be adapted to permit selection of various power settings.

According to one feature of the present invention, handle assembly 34 is releasably connected to pivot pin 48 for relatively easy installation and removal of handle assembly 34 for convenient storage. Another feature of the present invention includes means for reversal of handle assembly 34 at the end of each mower run in a controlled, deliberate fashion. Therefore, handle assembly 34 is positively latched to inhibit inadvertent or accidental reversal thereof. In particular, integrally formed on deck housing 12 are two parallel, laterally offset upstanding tower assemblies 70 and 72 each having a pivot pin 48 secured thereto. Tower assemblies 70 and 72 are adapted to permit forward and rearward pivotal motion of handle assembly 34 through a predetermined range of angular motion. In addition, tower assemblies 70 and 72 are adapted to provide simple and economical means for permanently installing pivot pin 48 to deck housing 12.

Figure 6:
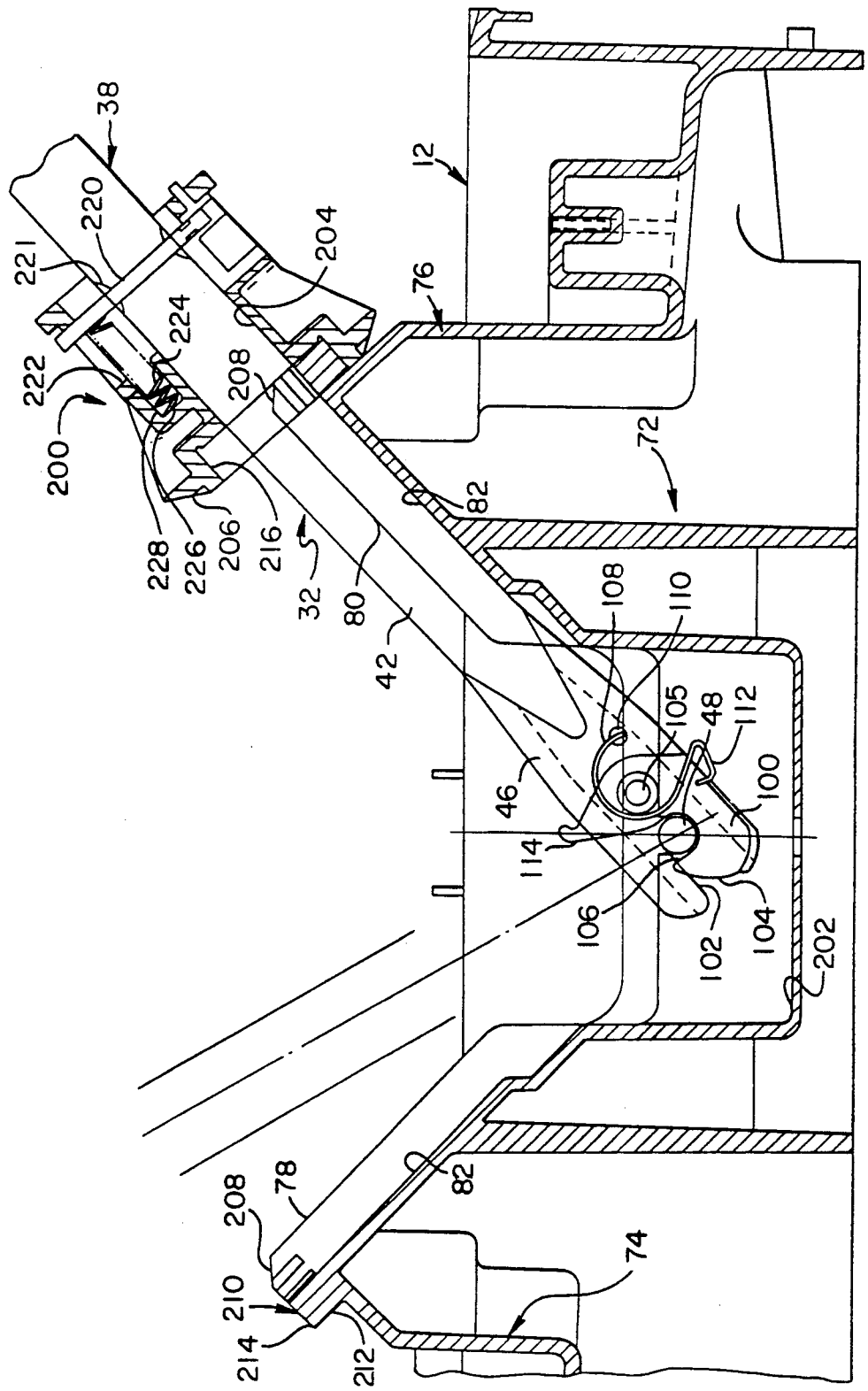
FIG. 6 is a cross-sectional view taken along lines B—B of FIG. 3 showing the operative association of the various components.

In general, tower assemblies 70 and 72 include a forward upstanding lug 74 and a rearward upstanding lug 76 each having diverging ramped surfaces 78 and 80, respectively (see FIG. 6). Ramped surfaces 78 and 80 have elongated semi-cylindrical recesses or cavities 82 adapted for mating engagement with first and second legs 40 and 42, respectively, of lower handle member 38.

Figure 3:
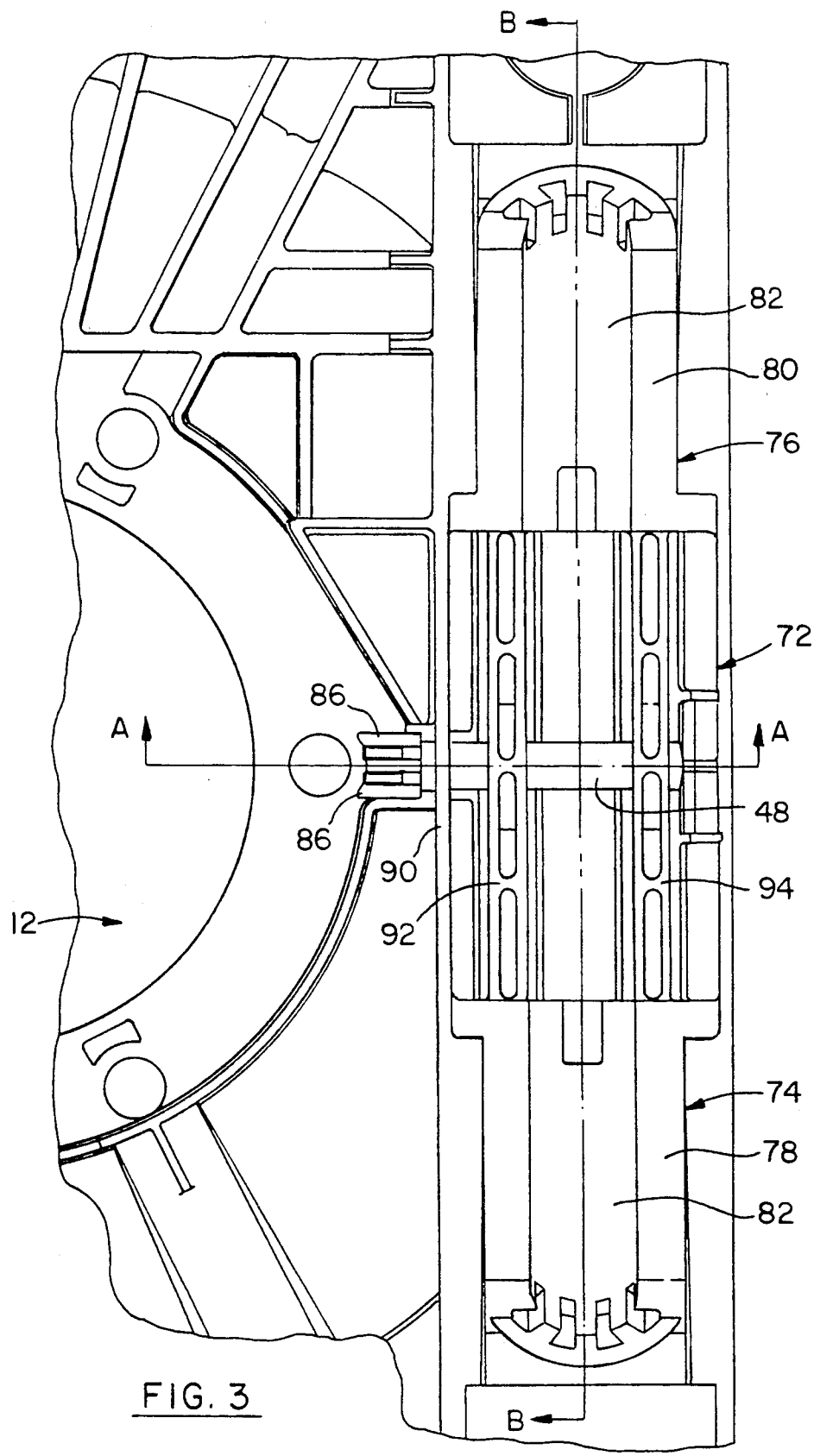
FIG. 3 is an enlarged view of FIG. 2 with the mower shroud removed for illustrating the pivot pin mounting and handle tower structure of the improved deck housing according to the present invention.
Figure 4:
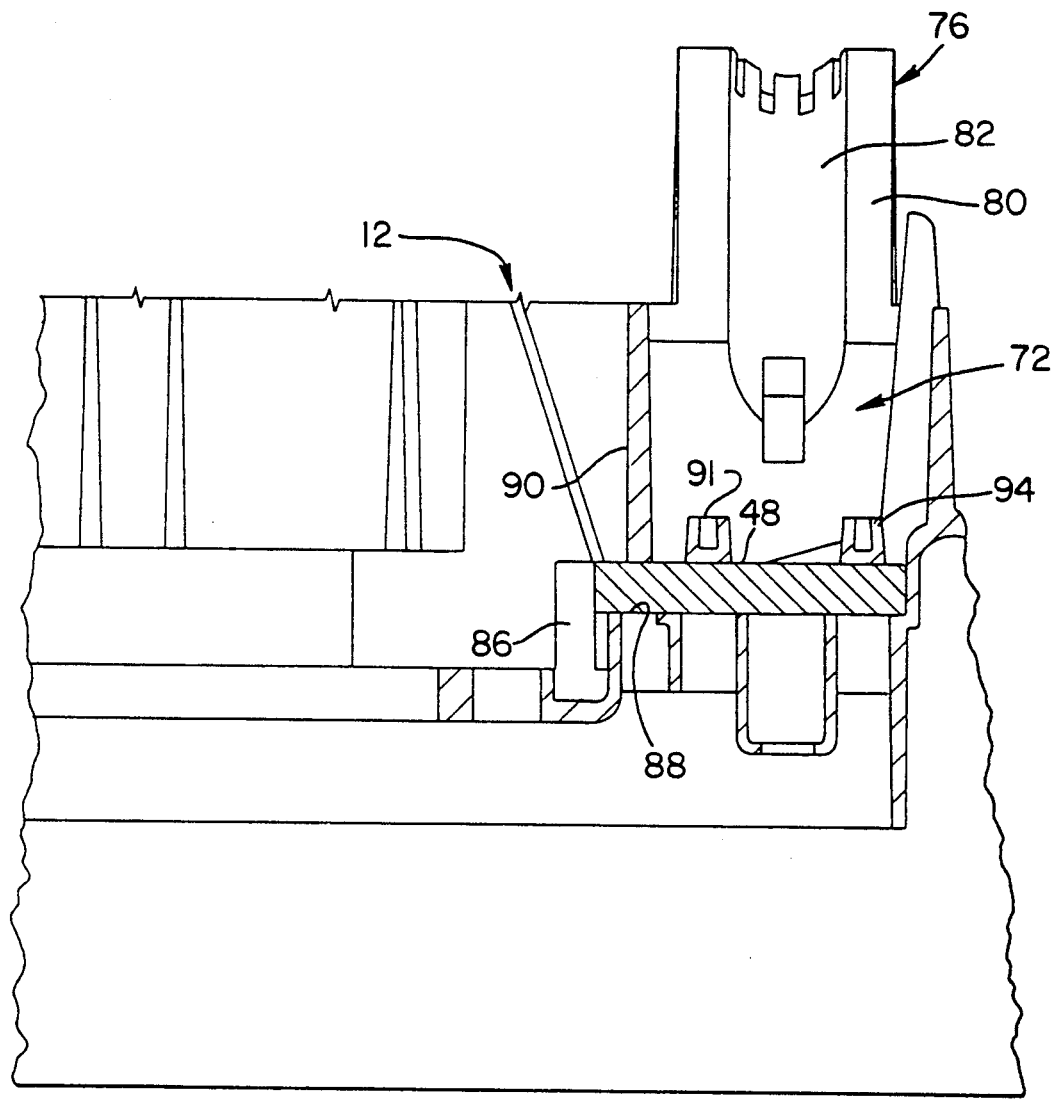
FIG. 4 is a cross-sectional view taken along lines A—A of FIG. 3.

FIGS. 3 and 4 illustrate a portion of deck housing 12 with protective shroud 26 removed and, in particular, tower assembly 72 and the means associated therewith for installing pivot pin 48 therein. In particular, a radially inward, longitudinally planar portion of deck housing 12 includes two upstanding snap fingers 86 which are aligned with a central generally horizontal bore 88 extending through a vertical tower wall surface 90 and two parallel upstanding support members 92 and 94. The snap fingers 86, tower wall 90 and support members 92 and 94 are, preferably, integrally formed on deck housing 12 as a unitary structure to eliminate the need of separate handle and pivot mounting brackets which conventionally required assembly onto the deck housing. While only tower assembly 72 is shown, it will be appreciated that the opposite lateral tower assembly 70 includes a substantially identical structure.

Figure 5A:
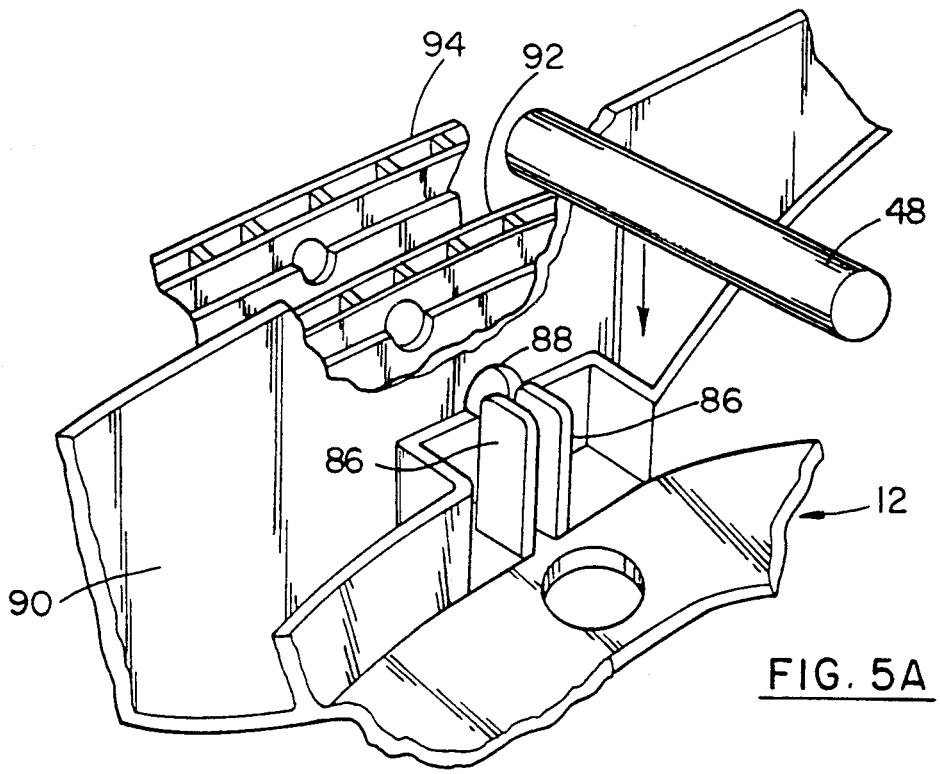
FIGS. 5A and 5B are fragmented perspective views of the pivot pin mounting structure which illustrate a method for installing a pivot pin into the deck housing.
Figure 5B:
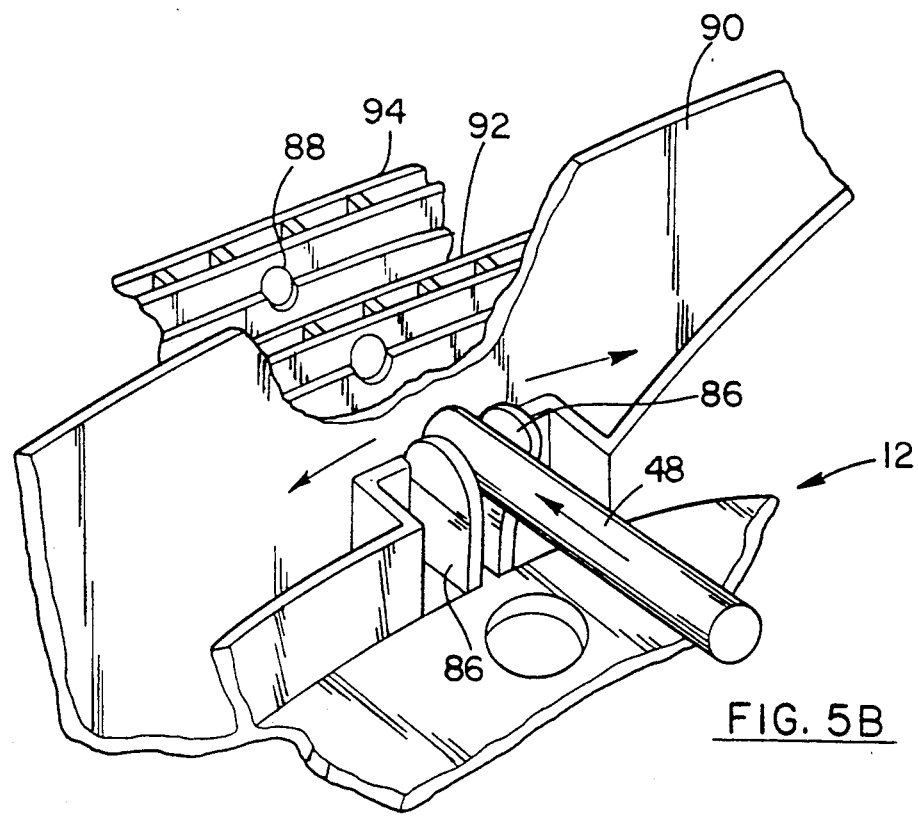

Referring now to FIGS. 5A and 5B, it is readily apparent that pivot pin 48 is installed within bore 88 in deck housing 12 in a relatively simple and economical manner. In particular, pivot pin 48 is initially downwardly directed until it engages an uppermost portion of snap fingers 86. Snap fingers 86 are relatively rigid members and are configured such application of a sufficient downward force causes snap fingers 86 to flex outwardly to permit access to horizontal bore 88. Thereafter, pivot pin 48 is inserted through central bore 88 so as to be supported by support members 92 and 94 within tower assembly 72. Following installation, snap fingers 86 return or "snap-back" to their normal parallel spaced orientation to prevent unintended removal of pivot pin 48 therefrom.

With particular reference to FIGS. 6 and 7, means for releasably connecting handle assembly 34 to pivot pin 48 are illustrated in greater detail. In general, an included angle of about 90° is provided between the divergent ramp surfaces 78 and 80 of forward upstanding lug 74 and rearward upstanding lug 76, respectively. In particular, an inclination angle of about 45° relative to a horizontal plane extending through pivot pin 48 for each of ramp surfaces 78 and 80 has been found to provide optimum handle positioning for comfortable mower manipulation and control. However, these angles are merely exemplary and may be varied according to particular application requirements.

The "handle to pivot pin" connection of the present invention includes use of a spring-biased pawl member 100 pivotally supported at each terminal end of the tubular legs of lower handle member 38. While the reference only shows terminal end 46 of second leg 42, it is to be understood that a substantially identical "handle to pivot pin" connection is employed for connecting terminal end 44 of first leg 40 to pivot pin 48 of tower assembly 70. Preferably, terminal end 46 is generally flattened to form a generally planar surface upon which pawl 100 is pivotably supported. An elongated slot 102 having an open end and a closed end is provided at the lowermost flattened end of terminal end 46 of second leg 42 and is sized to permit pivot pin 48 to be received therein. Elongated slot 102 is adapted to align handle assembly 34 and pawl 100 relative to pivot pin 48. Generally, the operator drops handle assembly 34 onto pivot pin 48 such that pivot pin 48 enters slot 102. Thereafter, pawl 100 engages pivot pin 48 such that pawl 100 is pivotally biased away from slot 102 until it snaps back underneath pivot pin 48 for lockingly holding handle assembly 34 in place while still permitting pivotal movement of handle assembly 34 relative to deck housing 12 about pivot pin 48. In this manner, handle assembly 34 is "latched" onto pivot pin 48. More particularly, pawl 100 is provided with an exterior ramp surface 104 and a pin-engaging cavity 106. During installation, ramp surface 104 initially engages pivot pin 48 such that pawl 100 is pivoted about pivot pin 105 in a direction against the normal biasing of spring 108. Pawl 100 continues to pivot in opposition to spring 108 until pivot pin 48 clears ramp surface 104. Thereafter, the normal biasing force of spring 108 pivots pawl 100 in an opposite direction so as to surround pivot pin 48 by enclosing it within pin engaging cavity 106. Spring 108 has a first end 110 secured to the flattened portion of terminal end 46 of second leg 42 and a second end 112 secured to pawl 100. Engaging cavity 106 is sized to permit pivotal motion of handle assembly 34 about pivot pin 48.

Pawl 100 includes a finger tab 114 for permitting the operator to release handle assembly 34 from pivot pin 48 when it is desired to remove the handle assembly from lawn mower deck 12. In particular, finger tab 114 is downwardly displaced by the operator so as to counteract the normal biasing force of spring 108. Concurrently, handle assembly 34 is lifted upwardly such that pivot pin 48 is displaced form slot 102. Pawl 100 is provided on each terminal end of U-shaped lower handle member 38 for permitting connection to pivot pins 48 associated with each of the tower assemblies 70 and 72 which are located on opposite sides of the motor.

Figure 7A:
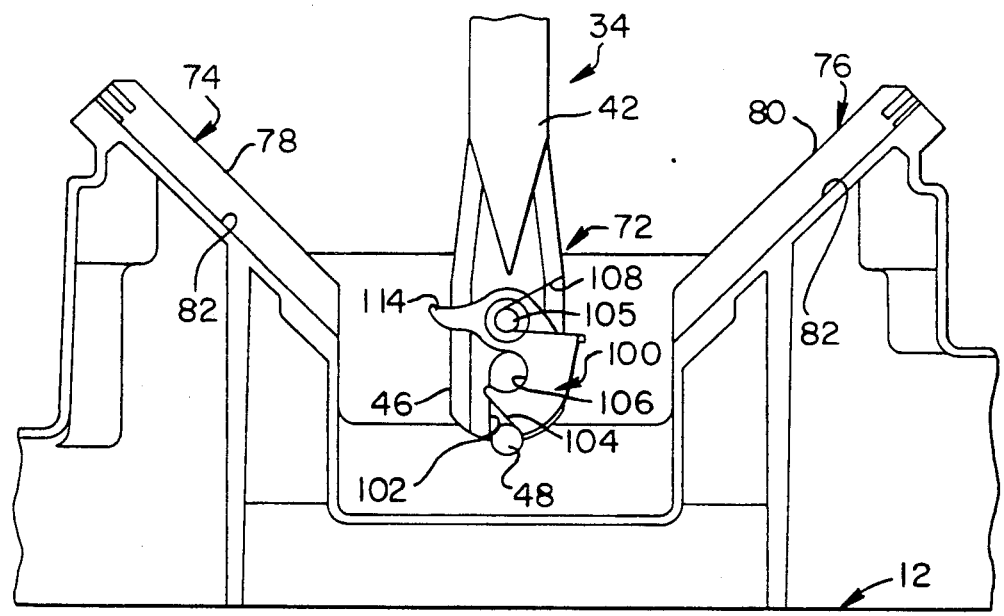
FIGS. 7A and 7B schematically illustrate a method for releasably connecting the handle assembly to the pivot pin.
Figure 7B:
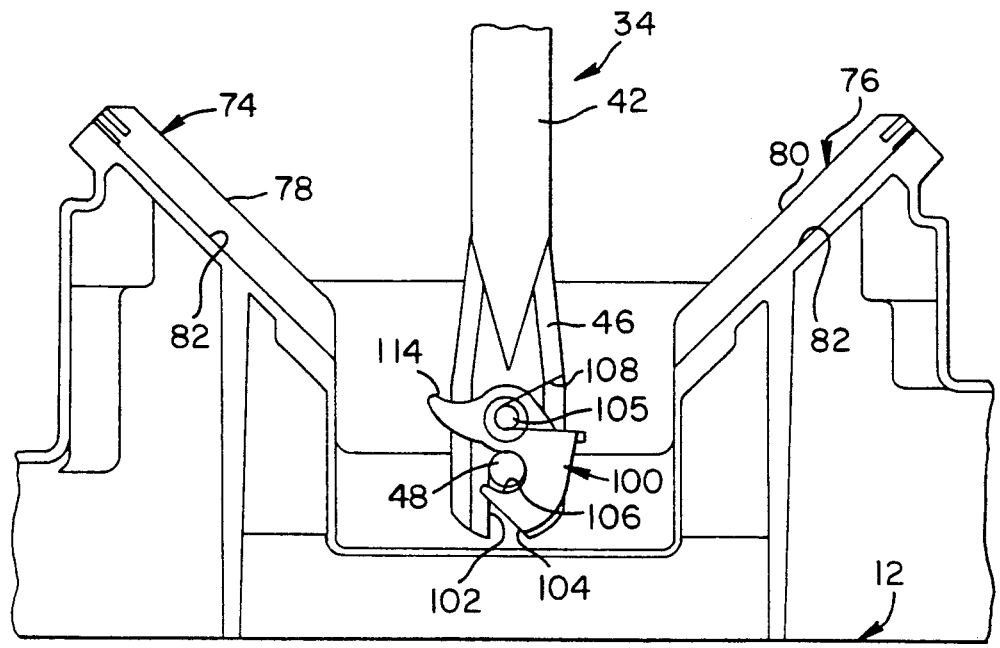
Figure 8:
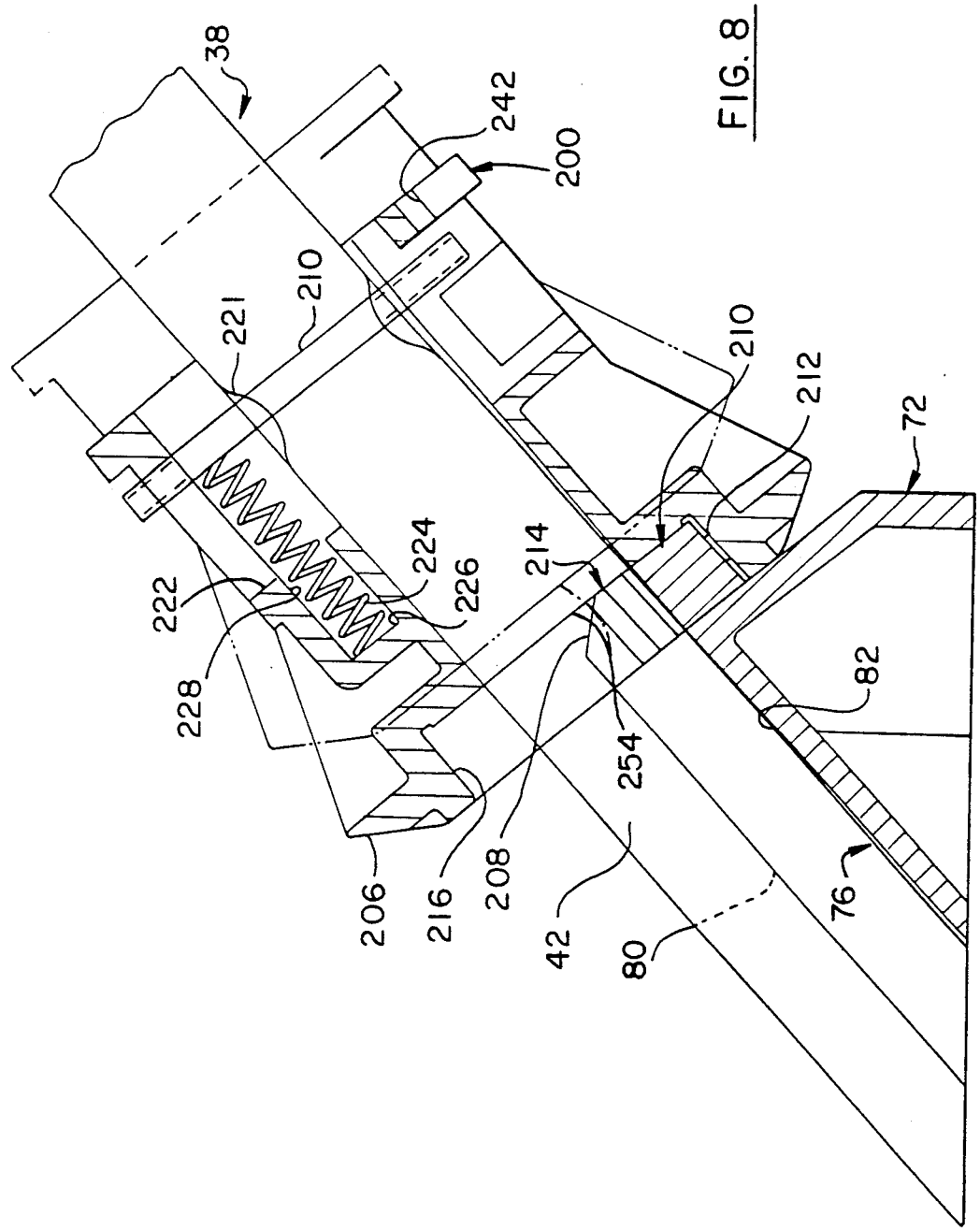
FIG. 8 is an enlarged cross-sectional view of FIG. 6 showing the handle latching mechanism of the present invention.

Referring to FIGS. 7A and 7B, a method of "latching" pawl 100 and, therefore, handle assembly 34 to pivot pins 48 is illustrated. More specifically, FIG. 7A shows ramped surface 104 of pawl 100 engaging pivot pin 48 upon application of a sufficient downward force such that pivot pin 48 enters slot 102. Pawl 100 is normally biased against the downward force by spring 108. FIG. 7B reflects the normal "latched" condition of pawl 100 for capturing pivot pin 48 in cavity 106 wherein spring 108 is biased for maintaining pivot pin 48 therein. As mentioned, the operator can release handle assembly 34 from pivot pin 48 by using finger tab 114 for pivoting pawl 100 out of engagement with pivot pin 48. Thereafter, the operator si able to lift handle assembly 34 away form pivot pin 48.

Referring now to FIGS. 1, 6, 8 and 9, it can be seen that in order to selectively control reversing of handle assembly 34 and to positively latch handle assembly 34 for inhibiting inadvertent or accidental "flip-over" during the process of a normal mowing run, a latch mechanism 200 is supported on second leg 42 and is adapted to coact with one of upstanding lugs 74 and 76 of tower assembly 72 to hold handle assembly 34 in either a forward or reversed pivoted position relative to deck housing 12. The construction of latch 200 and upstanding lugs 74 and 76 is such that it ensures retention of handle assembly 34 in one of the forward or reverse positions while requiring positive and deliberate actuation to effect the release thereof. Preferably, a minimum of controlled effort is needed from the operator to effect release of the latching mechanism.

The improved "handle to deck" latching system of the present invention is illustrated in greater detail, again with reference to FIGS. 1, 6, 8 and 9. In particular, a single latch member 200 is mounted coaxially over leg 42 of lower handle member 38 and is adapted to be selectively movable in telescopic fashion relative thereto. With particular reference to FIG. 6, tower assembly 72 is shown as illustrating forward upstanding lug 74 and rearward upstanding lug 76 which mutually extend from a central recessed cavity 202 within which pivot pin 48 is housed. Both upstanding lugs 74 and 76 include ramped surfaces 78 and 80, respectively, shown to be diverging approximately 45° from a horizontal plane through an origin point defined by pivot pin 48. Latch member 200 has a central axial bore 204 through which tubular handle leg 42 extends. Latch member 200 includes a lower camming surface 206 which is adapted to initially engage a lug camming surface 208 which is located adjacent the outermost end of ramp surfaces 78 and 80 on the lugs. Contiguous with lug camming surface 208 is outwardly extending tab 210 which terminates in an undercut portion 212. Tab 210 includes an outer planar surface 214 which is generally perpendicular relative to ramp surfaces 78 and 80.

Latch member 200 also includes a recessed annular cavity 216 which is sized to surrounding capture planar surface 214 and undercut portion 212 of tab 210. Latch member 200 is normally biased downwardly for "snap-in" latched engagement with tab 210 on one of the upstanding lugs so as to define a positively "latched" position. In the "latched" position, the legs of lower handle member 38 are nested within elongated semi-cylindrical cavity 82 formed on each of upstanding lugs 74 and 76. Semicylindrical cavity 82 provides a relatively rigid elongated surface upon which the handle legs rest.

Latch member 200 further includes a recessed area adapted to generally surround a pin 220 which is fixedly connected to tubular leg 42. Pin 220 extends through a bore 221 in tubular leg 42 for trapping latch 200 on tubular leg 42. In particular, the recessed area defines an elongated slot 222 which coacts with pin 220 to define the range of telescopic non-rotational motion of latch member 200 relative to tubular leg 42. In addition, a compression spring 224 is disposed against a spring seat 226 formed as a lower surface of a cylindrical cavity 228 within latch 200 and which communicates with slot 222. Compression spring 224 is disposed in cavity 228 so as to be below and in engagement with pin 220 for normally biasing latch member 200 downwardly toward the "latched" position. Therefore, if the operator attempts to pivot handle assembly 34, undercut portion 212 of tab 210 acts on a complimentary surface of annular cavity 216 to inhibit pivotal movement of latch 200 and, consequently, handle assembly 34.

Figure 10:
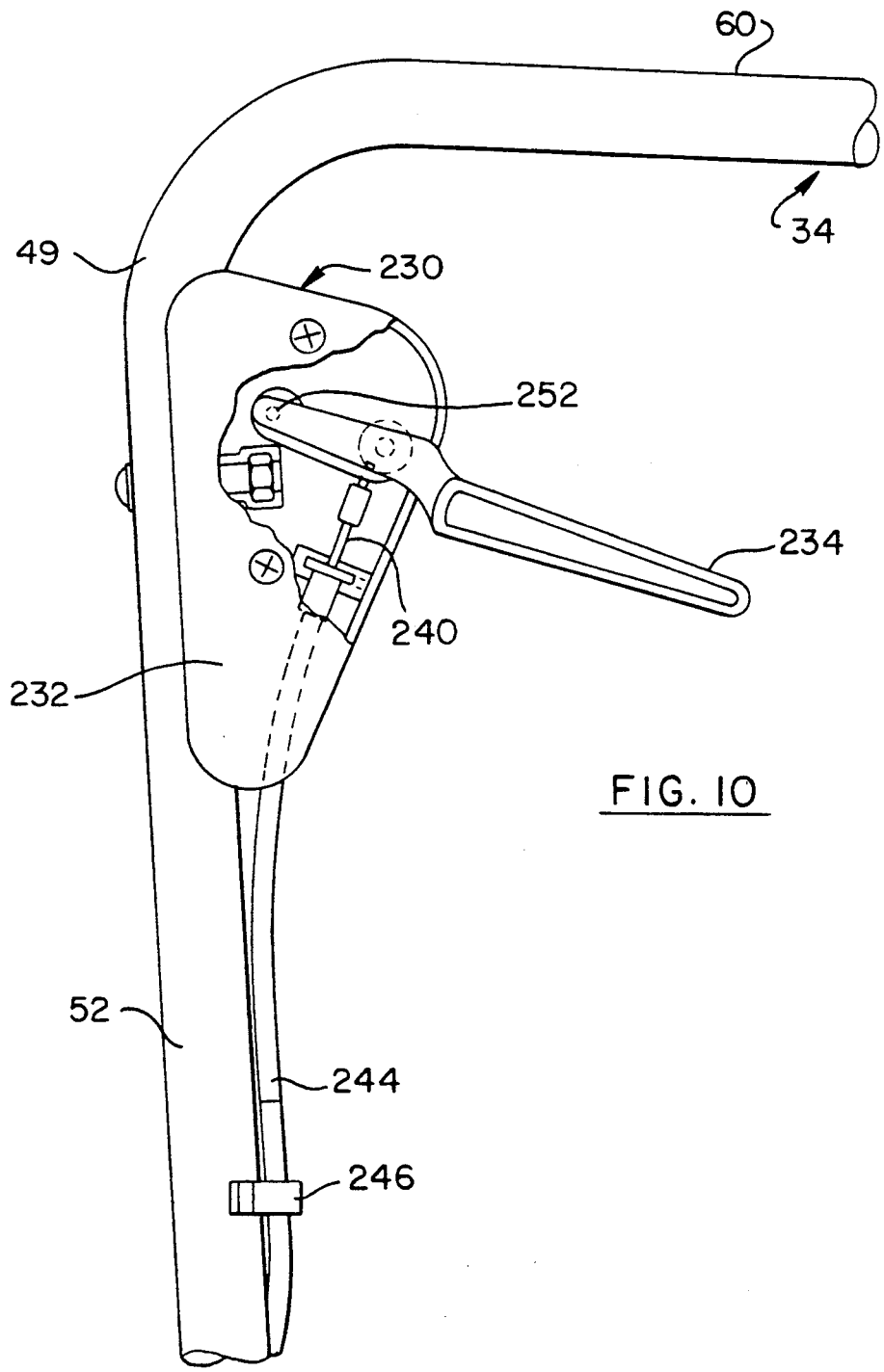
FIG. 10 is a view, partially broken away, of an operator actuated release mechanism for the handle latching mechanism.

In the operator wishes to "flip-over" handle assembly 34 for pushing mower 10 in an opposite direction, the operator actuates a release mechanism 230 mounted on leg 52 of upper handle member 49 (FIGS. 1 and 10) in order to selectively control the telescopic movement of latch member 200. Release mechanism 230 includes a housing 232 from which extends release lever 234 which is connected to latch member 200 by an elongated control cable 240. The control cable 240 extends along tubular handle assembly 34 with one end of control cable 240 attached to latch 200 such as through an orifice 242 FIG. 8. A major portion of control cable 240 si covered and protected by an outer sheath 244 which slidably receives cable 240 therein and which is fixed to handle assembly 34 as by a plurality of clamps 246. The opposite end of control cable 240 is secured to release lever 234. Compression spring 224 normally biases cable 240 and, in turn, release lever 234 in a first direction about pivot 252 FIG. 10. Thus, when it is desired to "flip" or reverse handle assembly 34, the operator pulls upwardly on release lever 234 against the biasing action of the spring 224 acting thereon. In this manner, control cable 240 is axially upwardly displaced for urging latch 200 to move upwardly against the normal biasing of compression spring 224 so as to define a "released" position (phantom liens in FIG. 8.). In the upward "released" position, latch 200 is disengaged from tab 210 such that a lowermost surface 254 of latch 200 if clear of outer lug surface 214. In this condition, handle assembly 34 is now free to pivot between forward and rearward lugs 74 and 76, respectively, of tower assemblies 70 and 72.

Figure 9A:
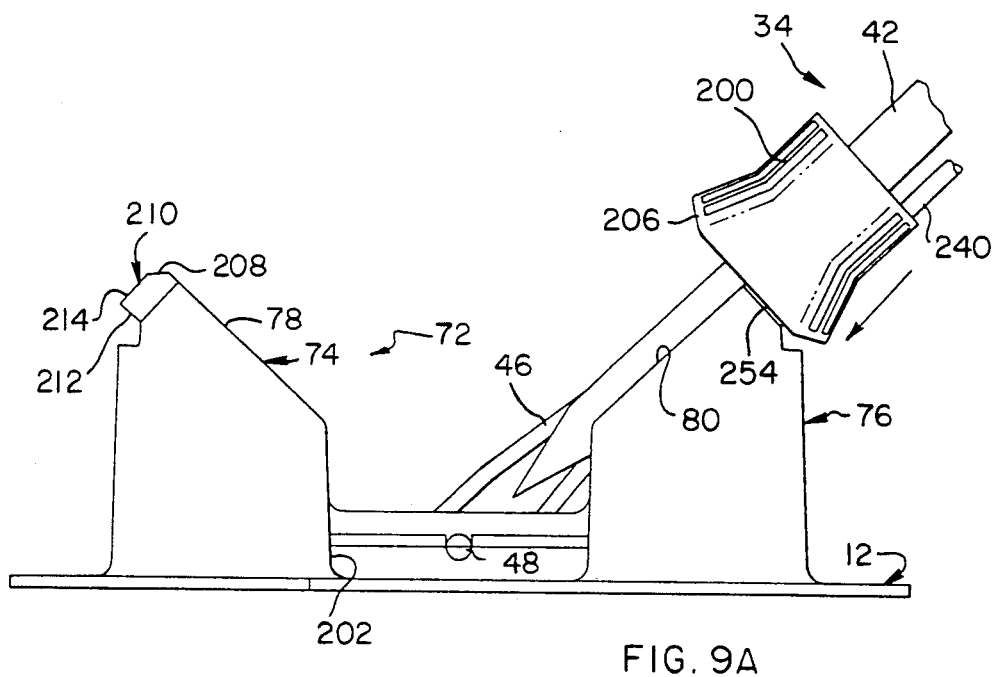
FIG. 9A through 9D schematically illustrate a method for pivotally releasing and latching the handle assembly for movement between a forward and a reverse position.
Figure 9B:
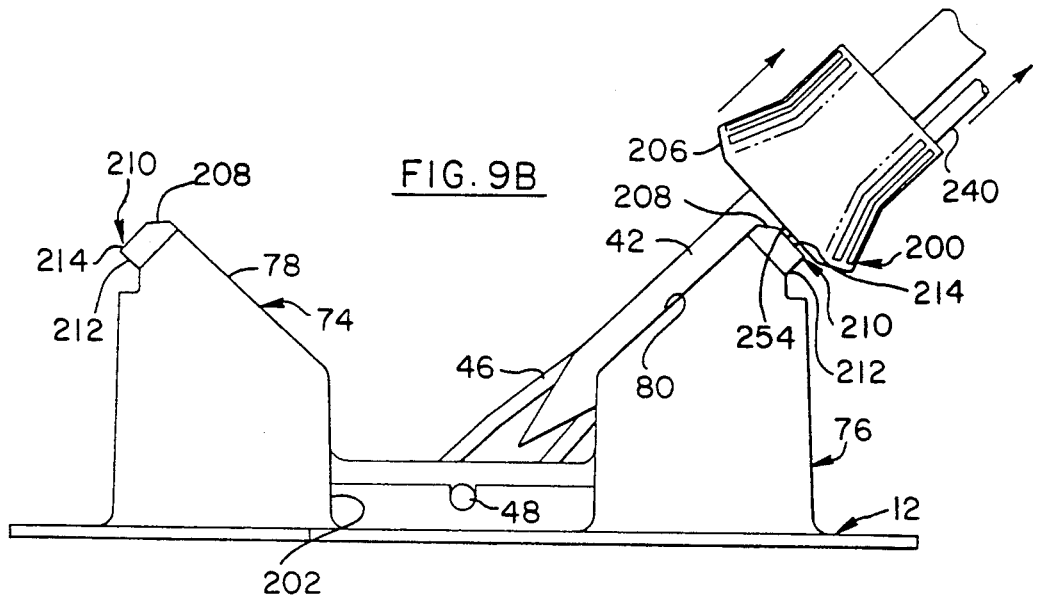

Referring now to FIGS 9A through 9D, a method for moving latch member 200 between its "released" and "latched" positions is shown. In particular, FIG. 9A illustrates handle assembly 34 being positively "latched" to rearward lug 76. As such, pivotal movement of handle assembly 34 is restricted. FIG. 9B illustrates the relative position of latch member 200 following upward movement of control cable 240 by the operator pivoting release lever 234 such that lower surface 254 of latch member 200 is disengaged form tab 210 of rearward leg 76. Thereafter, handle assembly 34 is free for pivotal movement. Slight pivoted movement of handle assembly 34 away from rearward lug 76 prevents "snap-in" re-latching of latch 200 onto tab 210 following release of release lever 234 by the operator since undercut section 212 is no longer capable of being surroundingly captured within annular cavity 216 of latch member 200.

Figure 9C:
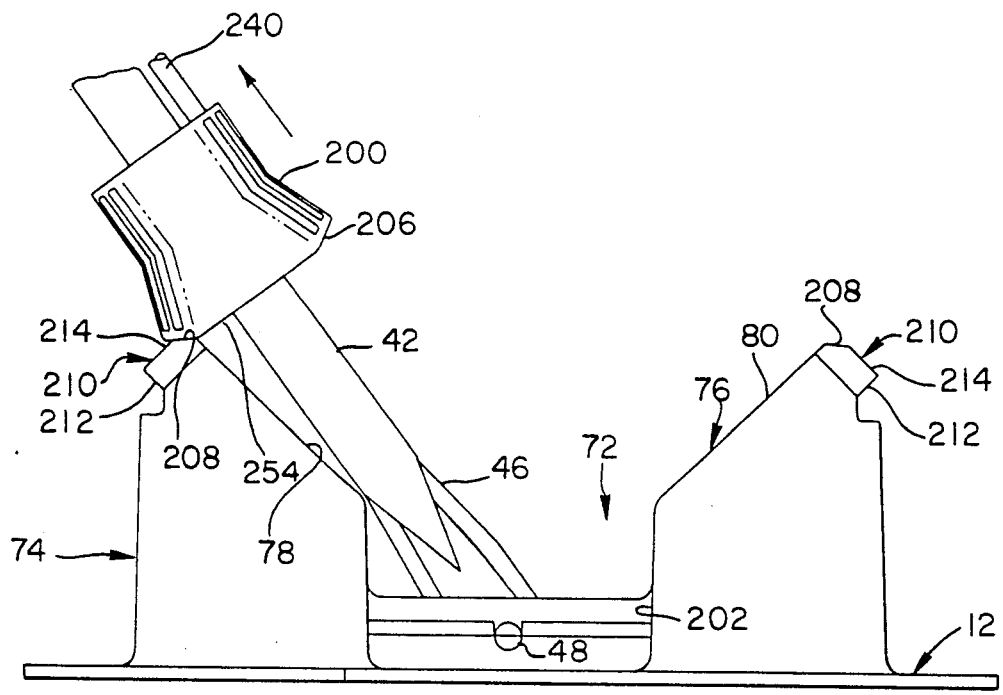
Figure 9D:
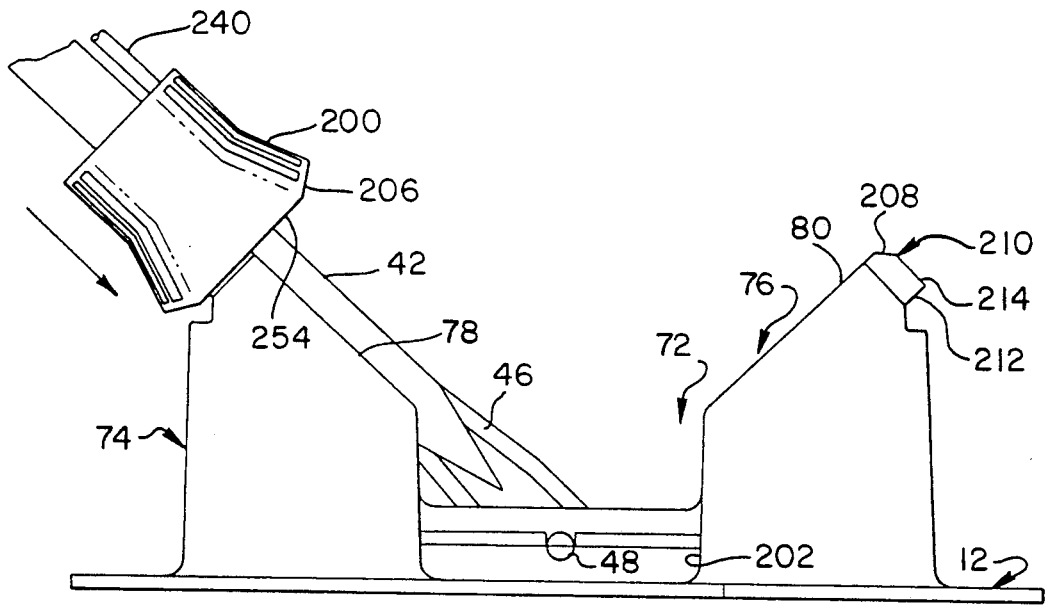

FIG. 9C illustrates the position of handle assembly 34 following pivotal motion about pivot pin 48 to forward lug 74. In particular, camming surface 206 of latch member 200 engages lug camming surface 208 of forward lug 74. With further references to FIG. 8 such engagement applies a force on latch 200 which overcomes the normal biasing force of compression spring 224. Therefore, latch 200 is moved in a direction away from its normal "latched" position due to initial engagement with lug 76. Continued pivoted movement acts to "snap-in" tab 210 on forward lug 76 within annular cavity 216 (FIG. 9D) for lockingly engaging ("latching") latch member 200 to forward lug 76. In particular, compression spring 224 normally biases latch member 200 downwardly such that cavity 216 captures tab 210 therein. Again, during release by the operator, latch member 200 is moved telescopically upward relative to handle tube 42 for disengaging surface 254 of latch member 200 from tab 210 on forward lug 74. It should be apparent that latch member 200 is telescopically movable over both handle tube leg 42 and tab 210 formed on upstanding lugs 78 and 80. Preferably, only a single latch member 200 is required to provide sufficient locking of handle assembly 34. It will be further appreciated that tower assemblies 70 and 72 together with snap fingers 86 are integrally cast or molded on deck housing 12 which further contributes to lower manufacturing and maintenance costs. In addition, the appearance and overall aesthetics of mower 10 are improved.

In addition, release lever 234 is located on the opposite side of mower 10 from discharge opening 36 and line cord 30. Thus, when handle assembly 34 is "flipped-over" at the end of a mower run, with the motor and blade still in operation, the operator will be compelled to walk around the side of the mower opposite discharge opening 36 and consequently will be in less danger of being struck by flying objects discharged therefrom.

The foregoing discussion discloses and describes an exemplary embodiment of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A lawn and garden devices comprising:
    a deck housing supported for longitudinal movement over the ground, said deck housing having pivot support means for supporting a pivot pin thereon:
    a pivot pin connected to said pivot support means;
    handle means having a first end adapted for connection to said pivot pin, said handle maens extending upwardly from said first end to a second end and adapted to be grasped by an operator;
    said first end defining an elongated slot having an open end and a closed end, said slot sized to permit said pivot pinto be received therein at said open end;
    latch means supported on said first end of said handle means and operatively associated with said elongated slot for releasably connecting said first end of said handle means to said pivot pin, said latch means movable between a first position for lockingly capturing said pivot pin in said elongated slot and a second position for releasing said pivot pin;
    biasing means for normally biasing said latch means toward said first position; and
    manual release means for permitting the operator to move said latch means to said second position in opposite to said biasing means whereby said operator may remove said handle means from said deck housing.

2. The lawn and garden device of claim 1 wherein said pivot support means includes first and second upstanding support structures located on opposite lateral sides of said deck housing, each of said upstanding support structures supporting a pivot pin therein.

3. The lawn and garden device of claim 2 wherein said handle means includes a handle assembly having a lower handle member with first and second downwardly extending legs, each of said first and second legs having a terminal end adapted to pivotally support said latch means thereon.

4. A removable handle assembly for use with lawn and garden devices of the type having a deck housing supported for longitudinal movement over the ground, the deck housing supporting a pair of laterally displaced pivot pins thereon, comprising:
    an upper handle position adapted to be grasped by an operator;
    a lower handle portion having first and second downwardly extending leg members adapted for connection to the pivot pins;
    an open-ended elongated slot formed in the terminal ends of said first and second leg members, said slot extending axially upwardly from its open end at said terminal ends and adapted to receive a pivot pin therein via said open end;
    latch means operatively associated with said open-ended slot for releasably securing said first and second leg members to the pivot pins, said latch means supported form said terminal end of said first and second leg members and adapted for movement between a latched position blocking said pivot pins from disengagement from said slots via said slot open ends for locking said leg members to the pivot pins and a released position for releasing said leg members form the pivot pins;

biasing means for normally biasing said latch means to said latched position; and release means formed on said latch means for permitting the operator to move said latch means to said released position for removing said handle assembly from the deck housing by disengaging said pivot pins form said slots via said slot open ends.

5. The handle assembly of claim 4 wherein the deck housing further comprises first and second upstanding support structures located on opposite lateral sides of the deck housing, each of sad upstanding support structures supporting one of the pivot pins therein.

6. A releasable handle assembly for use with lawn and garden devices of the type having a deck housing supported for longitudinal movement over the ground, the deck housing supporting a pair of laterally displaced pivot pins, comprising:

an upper handle section having an end portion adapted to be grasped by an operator;

a lower handle section having first and second downwardly extending leg members adapted for connection to the pivot pins, said first and second leg members each having an axially extending elongated slot formed on its lowermost terminal end which is adapted to receive the pivot pin therein upon installation of said handle assembly onto the deck housing;

a pawl member pivotably secured to each of said first and second leg members at its respective terminal end so as to be adjacent said elongated slot, said pawl member having a camming surface adapted to pivot said pawl member in a first direction upon engagement of said camming surface with the pivot pin, said pawl member having a pin engaging surface adjacent said camming surface for capturing the pivot pin within said slot upon continued engagement of said pawl member with the pivot pin whereby said pawl is pivoted in a second direction;

biasing means secured between said pawl member and said terminal end of each of said first and second leg members for biasing said pawl member in said second direction to define a latched position; and a manual release member formed on said pawl member for permitting the operator to pivot said pawl in said first direction in opposition to said torsion spring for releasing the pivot pin from said pin engaging surface such that said handle assembly may be removed from the deck housing.

7. The handle assembly of claim 6 wherein the deck housing further comprises first and second upstanding supports located on opposite lateral sides of the deck housing, each of said upstanding support structures supporting one of the pivot pins therein.

8. The handle assembly of claim 7 wherein said first and second upstanding supports are integrally formed on the deck housing and include a transversely extending bore adapted to receive the pivot pins therein and means for permitting insertion of the pivot pin into said bore while inhibiting subsequent removal of the pivot pin from said bore.

9. A mobile lawn and garden device comprising:

a deck housing supported for longitudinal movement over the ground;

a handle means having a first end pivotally secured to said deck housing, said handle means extending upwardly from said first end to a second end thereof adapted to be grasped by an operator;

support means formed on said deck housing for supporting said handle means in one of first and second operative inclined positions;

latch means supported on said means for locating and retaining said handle means relative to said support means in one of said first and second operative inclined positions, said latch means includes a latch member telescopically movable on, and relative to, said handle means between a first position for retaining said handle means on said support means and a second position for releasing said handle means from said support means;

biasing means for biasing said latch member toward said first position; and release means for permitting the operator to move said latch member to said second position in opposition to said biasing means whereby the operator is thereafter able to pivotably move said handle means from one of said first and second operatively inclined positions to the other.

10. A mobile lawn and garden device comprising:

a deck housing supported for longitudinal movement over the ground;

a handle assembly having a lower handle section with first and second downwardly extending leg members, a terminal end of said first and second leg members pivotally secured to said deck housing, said handle assembly extending upwardly and including an upper handle section having a handle grip adapted to be grasped by an operator;

laterally offset handle towers formed on said deck housing, each of said handle towers having an upstanding forward and rearward lug having surface means for supporting said first and second legs of said handle assembly in a forward or rearward inclined orientation relative to said deck housing;

a latch member coaxially supported for telescopic movement on one of said first and second leg members and which is adapted for locating and retaining said handle assembly relative to one of said forward and rearward lugs so as to orient said handle assembly in one of said first and second operative inclined positions, said latch member telescopically movable relative to said leg member between a first position for inhibiting pivotal movement of said handle assembly and a second position for permitting pivotal movement of said handle assembly;

a pin member extending through said leg member for supporting said latch member on said leg member, said latch member having an inner slot-like chamber adapted to coact with said pin member for defining a predetermined range of telescopic movement of said latch member on said leg member;

a spring member disposed between said slot-like chamber and said pin member for normally biasing said latch member toward said first position; and a release mechanism for permitting the operator to move said latch member to said second position in opposition to said spring member, whereby actuation of said release mechanism permits the operator to pivotably move said handle assembly between said forward and rearward lugs.

11. The mobile lawn and garden device of claim 10 wherein said pair of laterally offset towers each include means for supporting a pivot pin between said forward and rearward lugs, said terminal end of said first and second leg members having latch means for releasably connecting said handle assembly to said pivot pins.

12. The mobile lawn and garden device of claim 10 wherein said surface means associated with each of said upstanding forward and rearward lugs defines upwardly facing diverging ramp surfaces for defining said forward and rearward inclined positions of said handle assembly relative to said deck housing; said ramp surfaces having an elongated cavity adapted for matingly engaging a portion of said first and second legs of said lower handle section, and wherein said ramp surface terminates in a tab member configured for being surroundingly captured by an annular cavity extending upwardly from a lower surface of said latch member whereby said handle assembly is restricted from pivotal movement.

13. The mobile lawn and garden device of claim 12 wherein said tab member includes a camming surface which is adapted to engage a complimentary camming surface on said lower surface of said latch member such that engagement of said camming surfaces acts to urge said latch member toward said second position until said tab member is captured within said annular cavity of said latch member.

14. The mobile lawn and garden device of claim 13 wherein said release mechanism includes a release lever mounted to said handle assembly adjacent said handle grips and a control cable having a first end connected to said release lever and a second end connected to said latch member, said release lever movable by the operator for urging said latch member to telescopically move toward said second position so as to disengage said latch member from said tab member, and wherein said release lever is normally biased to inhibit telescopic movement of said latch member toward second position.

15. A rotary lawn mower comprising:
a deck housing supported for longitudinal movement over the ground, said deck housing having pivot support means for supporting a pivot pin thereon;
handle means having a first end adapted for connection to said pivot pin, said handle means extending upwardly from said first end and having handle grip means adjacent a second end thereof adapted to be grasped by an operator;
support means formed on said deck housing for supporting said handle means in one of a first and second operative inclined positions;
first latch means supported on said first end of said handle means for releasably connecting said first end of said handle means to said pivot pin, said first latch means movable between a first position for lockingly capturing said pivot pin and a second position for releasing said pivot pin;
first biasing means for normally biasing said first latch means toward said first position;
manual means for permitting the operator to move said first latch means to said second position in opposition to said first biasing means whereby said handle assembly is released from said pivot pin for removal from said deck housing;
second latch means affixed to said handle means for locating and retaining said handle means relative to said support means in one of said first and second operative inclined positions, said second latch means movable on said handle means between an engaged position for retaining said handle means on said support means and a disengaged position for releasing said handle means from said support means;
second biasing means for biasing said second latch means toward said engaged position; and
release means for permitting the operator to move said second latch means toward said disengaged position in opposition to said second biasing means whereby the operator is able to pivotably move said handle means about said pivot pin between said first and second operative inclined positions.

16. The rotary lawn mower of claim 15 wherein said handle means is a handle assembly having a lower handle member with first and second downwardly extending legs, each of said first and second legs having a terminal end adapted to pivotably support said first latch means thereon.

17. The rotary lawn mower of claim 16 wherein said first latch means is a pawl member pivotably secured about a first pivot point on said terminal end of said first and second legs, said pawl member having a camming surface adapted to pivot said pawl member toward said second position upon initial engagement with said pivot pin, said pawl member further having a recessed pin engaging surface adjacent said camming surface for capturing said pivot pin thereon upon continued engagement with said pivot pin such that said pawl member is pivoted to said first position.

18. The rotary lawn mower of claim 17 wherein said terminal ends of said first and second legs of said lower handle member form an axially extending elongated slot adapted to receive said pivot pin therein, said pawl member pivotally supported on said terminal end of said legs for capturing said pivot pin within said slot when said pawl member is in said first position.

19. The rotary lawn mower of claim 17 wherein said manual means includes a finger tab formed on said pawl member for permitting the operator to pivot said pawl member towards said second position thereby releasing said pivot pin from said recessed pin engaging surface for removal of said handle assembly from said deck housing.

20. The rotary lawn mower of claim 15 wherein said support means include two laterally offset handle tower assemblies, each of said handle tower assemblies having an upstanding forward and rearward lug and surface means for supporting said handle means in one of said first and second operative inclined positions, and wherein said pivot means is located generally between said upstanding forward and rearward lug so as to be integral with said pair of tower assemblies.

21. The rotary lawn mower of claim 20 wherein said second latch means includes latch member coaxially supported on one of said first and second downwardly extending legs and which is adapted for engagement with said forward and rearward lugs of one of said handle tower assemblies, said latch member telescopically movable relative to said leg and including means for defining a predetermined range of telescopic non-rotational motion thereon.

22. The rotary lawn mower of claim 21 wherein said surface means associated with each of said upstanding forward and rearward lugs defines upwardly facing diverging ramp surfaces, said ramp surfaces terminating at a distal end in tab means adapted for engaging said latch member when said latch member is in said engaged position whereby said handle assembly is restricted from pivotal movement.

23. The rotary lawn mower of claim 22 wherein said latch member further includes annular surface means for surroundingly capturing said tab means therein when said latch member is in said engaged position.

24. The rotary lawn mower of claim 15 wherein said release means includes a release lever mounted to said handle assembly adjacent said handle grip means and a control cable having a first end connected to said release lever and a second end connected to said latch member, said release lever movable in an upward direction for urging said latch member to said disengaged position.

25. A handle assembly for use with a mobile lawn and garden device of the type having a deck housing supported for longitudinal movement over the ground comprising;

two laterally offset handle towers formed on the deck housing, each of said handle towers forming an upstanding forward and rearward lug having upwardly facing divergent ramp surfaces defining a forward and rearward inclined orientation relative to the deck housing, each of said handle towers supporting a pivot pin therein located between said forward and rearward lugs;

said handle assembly having a lower handle section with first and second downwardly extending leg members, a terminal end of said first and second leg members being pivotably releasably connected to said pivot pins, said handle assembly extending upwardly and including an upper handle section having a handle grip adapted to be grasped by an operator, said terminal end of said first and second leg members having an upwardly axially extending elongated slot formed therein;

a pawl member pivotably secured to each of said first and second leg members at its respective terminal end so as to be adjacent said elongated slot, said pawl member having a camming surface adapted to pivot said pawl member in a first direction upon initial engagement of said camming surface with said pivot pin during installation of said handle assembly onto the deck housing, said pawl member having a pin engaging surface adjacent said camming surface for capturing said pivot pin within said elongated slot upon continued engagement of said pawl member with said pivot pin whereby said pawl member is pivoted in a second direction;

first spring means secured between said pawl member and said terminal end of each of said first and second leg members for biasing said pawl member in said second direction;

a release member formed on said pawl member for permitting the operator to pivot said pawl member in said first direction in opposition to the biasing force of said first spring means for releasing said pivot pin from said pin engaging surface such that the operator is permitted to remove said handle assembly from said deck housing;

a latch member coaxially supported for telescopic movement on one of said first and second leg members and which is adapted for locating and retaining said handle assembly relative to one of said forward and rearward lugs so as to orient said handle assembly in one of said first and second operative inclined positions, said latch member telescopically movable on said leg member between an engaged position for inhibiting pivotal movement of said handle assembly and a disengaged position for permitting movement of said handle assemblies;

pin means extending through said leg member for securing said latch member thereto, said latch member having an inner slot-like chamber adapted to coact with said pin member for defining a predetermined range of telescopic movement of said latch member;

second spring means disposed between said slot-like chamber and said pin member for normally biasing said latch member toward said first position; and a release mechanism mounted to said handle assembly for permitting the operator to move said latch member to said disengaged position in opposition to the biasing force of said second spring means, whereby actuation of said release mechanism permits the operator to pivotably move said handle assembly between said forward and rearward lugs.

26. The handle assembly of claim 25 wherein said ramp surfaces on said forward and rearward lugs have an elongated cavity adapted for matingly engaging a portion of said first and second legs of said lower handle section, and wherein said ramp surfaces terminate in a tab member configured for being surroundingly captured by an annular cavity extending upwardly from a lower surface of said latch member whereby said handle assembly is restricted from pivotal movement.

27. The handle assembly of claim 26 wherein said tab member includes a camming surface which is adapted to engage a complimentary camming surface on said lower surface of said latch member such that engagement of said camming surfaces acts to urge said latch member toward said disengaged position until said tab member is captured within said annular cavity of said latch member.

28. The assembly of claim 25 wherein said laterally offset towers are integrally formed on said deck housing and include a transversely extending bore adapted to receive said pivot pins therein and finger means for permitting insertion of said pivot pin into said bore while inhibiting subsequent removal of said pivot pin from said bore.

29. A lawn and garden devices comprising:

a deck housing supported for longitudinal movement over the ground, said deck housing having pivot support means for supporting a pivot pin thereon:

said pivot support means includes first and second upstanding support structures located on opposite lateral sides of said deck housing, each of said upstanding support structures supporting a pivot pin therein;

handle means having a first end adapted for connection to said pivot pin, said handle means extending upwardly from said first end to a second end adapted to be grasped by an operator;

said handle means includes a handle assembly having a lower handle member with first and second downwardly extending legs, each of said first and second legs having a terminal end;

latch means pivotally supported on said terminal ends of said handle assembly for releasably connecting said first end of said handle means to said pivot pin, said latch means movable between a first position for lockingly capturing said pivot pin and a second position for releasing said pivot pin;

said latch means includes a pawl member pivotally secured about a first pivot to said terminal end of said first and second legs, said pawl member having a camming surface adapted to pivot said pawl member toward said second position upon engagement with said pivot pin;

biasing means for normally biasing said latch means toward said first position; and manual release means for permitting the operator to move said latch means to said second position in opposition to said biasing means.

30. The lawn and garden device of claim 29 wherein said pawl member further comprises a recessed surface adjacent said camming surface for capturing said pivot pin therein upon continued engagement with said pivot pin such that said pawl is pivoted to said first position.

31. The lawn and garden device of claim 30 wherein said terminal ends of said first and second legs of said lower handle member form an axially extending elongated slot adapted to receive said pivot pin therein, said pawl member pivotally supported on said terminal end of said legs for capturing said pivot pin within said slot when said pawl members is in said first position.

32. The lawn and garden device of claim 31 wherein said manual release means includes a finger tab on said pawl member for permitting the operator to pivot said pawl member toward said second position thereby releasing said pivot pin form said recessed surface for removal of said handle assembly form said deck housing.

33. A lawn and garden devices comprising:
a deck housing supported for longitudinal movement over the ground, said deck housing having pivot support means for supporting a pivot pin thereon:

said pivot support means includes first and second upstanding support structures located on opposite lateral sides of said deck housing, each of said upstanding support structures supporting a pivot pin therein;

said upstanding support structures are integrally formed on said deck housing and include a transversely extending bore adapted to receive said pivot pin therein and finger means for permitting insertion of said pivot pin into said bore while inhibiting subsequent removal of said pivot pin from said bore, said finger means adapted to be elastically deflected upon initial contact with said pivot pin to provide access to said bore, said finger means adapted to return to its original orientation relative to said bore following insertion of said pivot pin into said bore;

handle means having first end adapted for connection to said pivot pin, said handle means extending upwardly form said first end to a second end adapted to be grasped by an operator;

latch means supported on said first end of said handle means for releasably connecting said first end of said handle means to said pivot pin, said latch means movable between a first position for lockingly capturing said pivot pin and a second position for releasing said pivot pin;

biasing means for normally biasing said latch means toward said first position; and manual release means for permitting the operator to move said latch means to said second position in opposition to said biasing means.

34. A handle assembly for use with lawn and garden devices of the type having a deck housing supported for longitudinal movement over the ground, the deck housing supporting a pair of laterally displaced pivot pins thereon, comprising:
an upper handle portion adapted to be grasped by an operator;

a lower handle portion having first and second downwardly extending leg members adapted for connection to the pivot pins;

slot means formed on terminal ends of said fist and second leg members, said slot means extending axially upwardly form said terminal ends and adapted to receive a pivot pin therein;

latch means for releasably securing said first and second leg members to the pivot pins, said latch means supported from said terminal end of said first and second leg members and adapted for movement between a latched position for locking said leg members to the pivot pins and a released position for releasing said leg members form the pivot pins;

said latch means includes a pawl member pivotally secured about a first pivot to said terminal end of said first and second legs, said pawl member having a camming surface adapted to pivot said pawl member toward said second position upon engagement of said camming surface with the pivot pin when the pivot pin is received within said slot means;

biasing means for normally biasing said latch means to said latched position; and release means formed on said latch means for permitting the operator to move said latch means to said released position for removing said handle assembly form the deck housing.

35. The handle assembly of claim 34 wherein said pawl member further comprises a recessed surface adjacent said camming surface for capturing the pivot pin therein upon continued engagement with the pivot pin such that said pawl member is pivoted to said first position.

36. The handle assembly of claim 35 wherein said release means includes a finger tab formed on said pawl member for permitting the operator to pivot said pawl member toward said second position thereby releasing said pivot pin from said recessed surface for removal of said handle assembly from said deck housing.

37. A handle assembly for use with lawn and garden devices, comprising:
a deck housing supported for longitudinal movement over the ground and supporting two laterally displaced pivot pins thereon;

the deck housing further comprises first and second upstanding support structures located on opposite lateral sides of, and integral with, the deck housing, each of said upstanding support structures supporting one of the pivot pins therein, and a transversely extending bore adapted to receive the pivot therein and finger means for permitting insertion of the pivot pin into said bore while inhibiting subsequent removal of the pivot pin from said bore;

an upper handle portion adapted to be grasped by an operator;

a lower handle portion having first and second downwardly extending leg members adapted for connection the pivot pins;

slot means formed on terminal ends of said first and second leg members, said slot means extending axially upwardly form said terminal ends and adapted to receive a pivot pin therein; latch means for releasably securing said first and second leg members to the pivot pins, said latch means supported form said terminal end of said first and second leg members and adapted for movement between a latch position for locking said leg members to the pivot pins and a released position for releasing said leg members form the pivot pins;

biasing means for normally biasing said latch means to said latched position; and release means formed on said latch means for permitting the operator to move said latch means to said released position for removing said handle assembly form the deck housing.

38. A mobile lawn and garden device comprising:

a deck housing supported for longitudinal movement over the ground;

a handle means having a first end pivotally secured to said deck housing, said handle means extending upwardly from said first end to a second end thereof adapted to be grasped by an operator;

support means formed on said deck housing for supporting said handle means in one of first and second operative inclined positions;

said support means includes two laterally offset handle tower assemblies, each of said handle tower assemblies having an upstanding forward and rearward lug having surface means for supporting said handle means in one of said first and second operative inclined positions;

latch means supported on said means for locating and retaining said handle means relative to said support means in one of said first and second operative inclined positions, said latch means is movable relative to said handle means between a first position for retaining said handle means on said support means and a second position for releasing said handle means from said support means;

biasing means for biasing said latch means toward said first position; and release means for permitting the operator to move said latch means to said second position in opposition to said biasing means whereby the operator is thereafter able to pivotably move said handle means form one of said first and second operative inclined position to the other.

39. The mobile lawn and garden device of claim 39 wherein said handle means includes is a handle assembly having a lower handle section with first and second downwardly extending legs, each of said first and second legs having a terminal end pivotally secured to a pivot pin associated with said handle tower assemblies, and wherein said latch means is coaxially supported on one of said first and second downwardly extending legs for engagement with said forward and rearward lugs.

40. The mobile lawn and garden device of claim 38 wherein said latch means includes a telescopically movable latch member having means for defining a predetermined range of telescopic nonrotational motion.

41. The mobile lawn and garden device of claim 40 wherein said surface means associated with each of said upstanding forward and rearward lugs defines upwardly facing diverging ramp surfaces, said ramp surfaces terminating at a distal end in tab means adapted for engaging said latch member when said latch member is in said first position whereby said handle assembly is restricted from pivotal movement.

42. The mobile lawn and garden device of claim 41 wherein said ramp surface include an elongated cavity adapted for supporting said legs of said lower handle member therein when said handle assembly is in one of said first and second operative inclined positions.

43. The mobile lawn and garden device of claim 41 wherein said latch member further includes annular surface means for surroundingly capturing said tab means therein when said latch member is in said first position.

44. The mobile lawn and garden device of claim 41 wherein said release means includes a release lever mounted to said handle assembly adjacent said handle grip means and a control cable having a first end connected to said release lever and a second end connected to said latch member, said release lever movable in an upward direction for urging said latch member to said second position.

45. A mobile lawn and garden device comprising:

a deck housing supported for longitudinal movement over the ground and having at least two opposite sides;

said deck housing defining a discharge opening in one of said two opposite sides;

a handle pivotally connected to said deck housing and having an end adapted to be grasped by an operator, said end having two opposite sides;

a support formed on said deck housing for supporting said handle in one of first and second operative inclined positions;

a latch supported on the handle adapted to locate and retain said handle in one of said first and second operative positions, said latch including a latch member moveable on said handle between a first position for retaining said handle on said support and a second position for releasing said handle from said support;

a release member mounted on said handle end and operatively associated with said latch member for enabling said operator to selectively move said handle into one of said first and second operative inclined positions by actuating said release member; and said release member being located on the side of said handle opposite the side of said deck housing defining said discharge opening.

* * * * *